(12) United States Patent
Simon et al.

(10) Patent No.: US 6,746,756 B2
(45) Date of Patent: Jun. 8, 2004

(54) POLYURETHANE COATED RESILIENT SURFACE COVERING HAVING IMPROVED FIDELITY OF TEXTURE AND PROCESS OF MANUFACTURE

(75) Inventors: Jean-Yves Simon, Chiny (BE); Dao Viet Dung, Aywaille (BE)

(73) Assignee: Tarkett Sommer, SA, Nanterre (FR)

( * ) Notice: Subject to any disclaimer, the term of this patent is extended or adjusted under 35 U.S.C. 154(b) by 0 days.

(21) Appl. No.: 10/345,693

(22) Filed: Jan. 16, 2003

(65) Prior Publication Data

US 2003/0129362 A1 Jul. 10, 2003

Related U.S. Application Data

(62) Division of application No. 10/007,934, filed on Dec. 7, 2001, now abandoned.

(51) Int. Cl.[7] .................................................. B05D 3/06
(52) U.S. Cl. ........................ 428/172; 428/156; 428/158; 428/160; 428/908.8
(58) Field of Search ................................. 428/156, 158, 428/159, 160, 161, 172, 908.8

(56) References Cited

U.S. PATENT DOCUMENTS 4,100,318 A * 7/1978 McCann et al. ............ 428/159

* cited by examiner

Primary Examiner—Harold Pyon
Assistant Examiner—Alicia Chevalier
(74) Attorney, Agent, or Firm—Norris, McLaughlin & Marcus

(57) ABSTRACT

Mechanically embossed resilient surface coverings having superior textural fidelity are prepared by mechanically embossing a polyurethane coated floorcovering before the polyurethane is cured. The mechanical embossing is conducted when the polyurethane is dry and the underlying plastic layer and the polyurethane are softened by heating. After the mechanical embossing step, the polyurethane is cured using ultraviolet (UV) light. The product can be cooled before or after UV curing. The invention is applicable to a variety of resilient surface covering products including floor and wall coverings which otherwise have a wearlayer which can be softened by heating. This includes surface coverings having the full range of decorative effects available in the art, including surface coverings which also have been, for example, chemically embossed, mechanically embossed, chemically and mechanically embossed or not embossed at all prior to application of the process of the invention.

10 Claims, 2 Drawing Sheets

POLYURETHANE COATED RESILIENT SURFACE COVERING HAVING IMPROVED FIDELITY OF TEXTURE AND PROCESS OF MANUFACTURE

CROSS-REFERENCE TO RELATED APPLICATIONS

This is a divisional application of Ser. No. 10/007,934 filed on Dec. 7, 2001, now abandoned.

BACKGROUND OF INVENTION

1. Field of the Invention

The present invention has to do with mechanically embossed resilient surface coverings. More particularly, the invention relates to resilient floorcovering having a photopolymer coating which is mechanically embossed and has a superior fidelity of texture which has not been achieved in previously known resilient products. In a preferred embodiment, the product is chemically embossed before it is mechanically embossed.

2. Description of the Related Art

Resilient surface coverings including sheet flooring, tile and wall covering are employed in residential, commercial and institutional applications where decorative effects, durability and ease of installation and maintenance are important considerations. The product can be designed to imitate other materials such as ceramic tile, wood, stone and brick, and straw, linen textiles, cork and the like, or it can be designed with unique combinations of color, particles and other decorative features which are not available in other types of surface coverings. In the current marketplace, consumers are increasingly demanding surface coverings with improved textural features, especially features which realistically imitate the textures of materials such as ceramic tile, wood, stone and brick, and straw, linen textiles, cork and the like. The surface covering industry has employed mechanical embossing, chemical embossing, a combination of mechanical and chemical embossing, screen printing and other techniques for decades in order to obtain design effects and textures which meet consumer demands.

The present invention is especially directed to the realistic imitation of surface textures from various kinds of floor and wall covering materials by employing materials and methods which can be used in new combinations with previously known materials and methods. The invention is applicable to surface coverings which can be coated with a photopolymer and mechanically embossed, particularly resilient sheet flooring, tile, wall covering and the like.

SUMMARY OF THE INVENTION

In accordance with this invention, a resilient surface covering is prepared with a plastic top layer and this layer is coated with a photopolymer. The photopolymer is subjected to heat, partial ultraviolet (UV) curing or ambient air so that it is dried but still thermoplastic (i.e., not cured). Then the surface is heated to soften the plastic top layer and the thermoplastic photopolymer. The softened surface is mechanically embossed followed by UV curing of the photopolymer. The product can be cooled before or after UV curing. The mechanically embossed product has a fidelity of texture which is superior to the textures obtained with previously known chemical and/or mechanical embossing and products which are urethane coated following embossing. The process of the invention also improves production yields by reducing the amount of product that needs to be scrapped due to defects in the polyurethane layer caused by unevenness, variations in gloss and the like.

In a preferred embodiment, a chemically embossed resilient flooring product is made by conventional means. When the product exits the fusion oven or a laminating unit, the wearlayer temperature is lowered. A water borne photopolymer polyurethane (PU) coating is then applied to the wearlayer and dried. Heat is applied to swell the surface (i.e., to soften the wearlayer and the PU layer) and the softened surface is mechanically embossed. Following this step, the material is either cooled down and then UV cured or it is UV cured followed by cooling. The material is taken up on large rolls for inspection and packaging. The process is modified as appropriate for other resilient surface coverings, depending upon their constriction, as will be described in more detail below.

DESCRIPTION OF THE PREFERRED EMBODIMENTS

The principles of the present invention can be applied to any resilient surface covering product having a plastic top layer which can be softened by heating to permit the creation of a texture by mechanical embossing. For purposes of this disclosure, surface coverings having these characteristics are referred to as a surface covering base. Accordingly, the surface covering base can include resilient floor and wall coverings in sheet form, flooring tiles, laminated surface coverings, linoleum and the like which can be coated with polyurethane and mechanically embossed according to the invention as long as the polyurethane coating is applied at a stage of production when the top surface of the surface covering base can be softened by heating. For example, if the top surface is vinyl, it can be softened for mechanical embossing following fusion or laminating and cooling. In some laminated products, such as linoleum, the laminated top surface, prior to its final curing, is coated with polyurethane. The polyurethane is then dried. Then the surface is heated to soften the laminated top surface and the polyurethane. The laminated top surface is then cured followed by UV curing of the polyurethane. In the case of laminating thermoplastic sheets, after the lamination the product is coated with the polyurethane followed by drying the polyurethane. Then the product is embossed followed by UV curing of the polyurethane. Other variations of the appropriate procedures will be apparent to those skilled in the art based upon the disclosures of the present specification.

Figure 1:
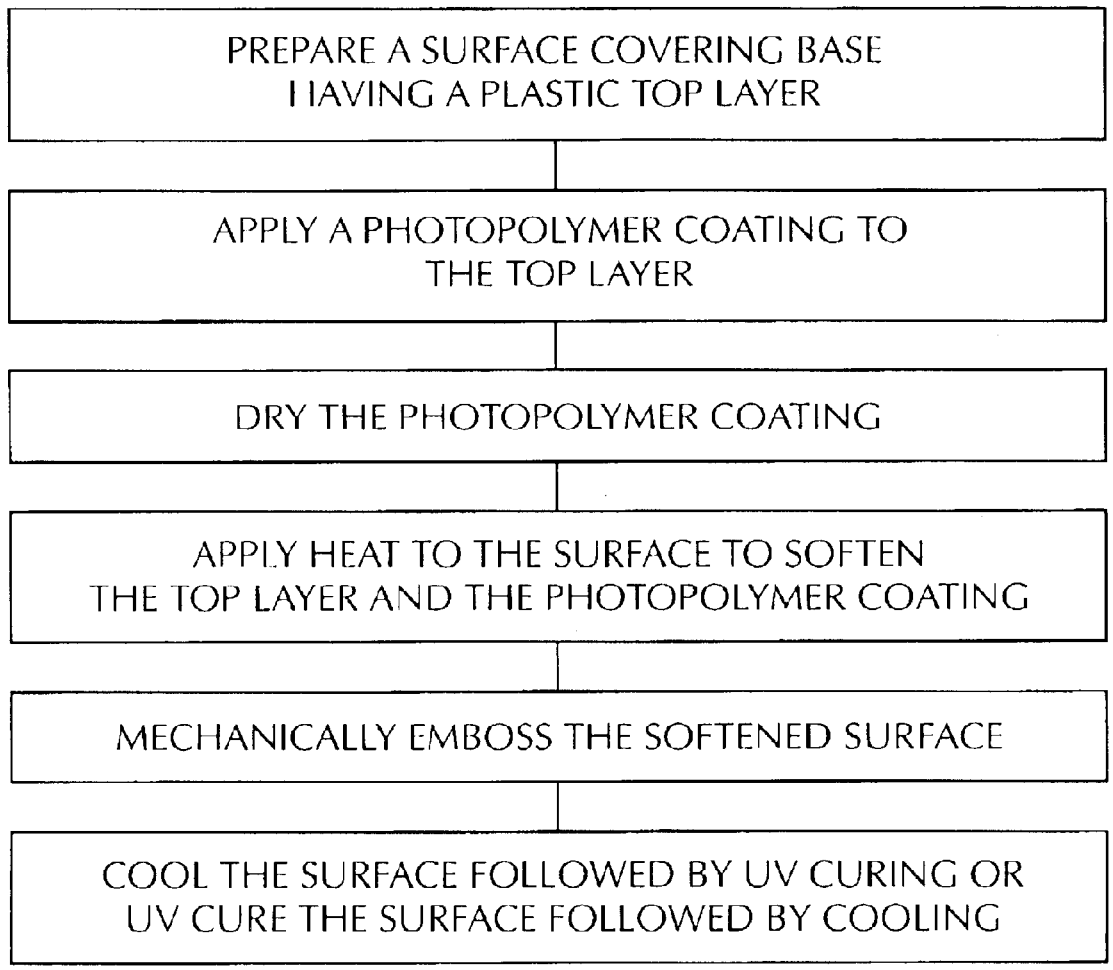
FIG. 1 is a flow diagram of a process of the invention.

Referring to FIG. 1, a foamable plastic layer is applied over a sheet substrate using conventional techniques. The combination is then heated to gel the plastic without activating the foaming agent. An ink containing chemical suppressants is applied in a design to the surface of the foamable, gelled plastic layer using conventional printing techniques. One or more layers of ink can be applied uniformly or in a design and inks without suppressants also can be applied to impart additional design features to the product. Then a clear liquid plastic top layer is applied over the printed surface followed by sufficient heating to fuse the product and activate the foaming agent. (Activating the foaming agent is referred to in the art as expanding the product.) When the product exits the fusion oven, the top surface temperature is lowered. A photopolymer PU coating is applied to the top surface and dried. Then heat is applied to swell the surface (i.e., to soften the plastic and the PU) and the softened surface is mechanically embossed using conventional techniques. Following this step, the material is either cooled down and then UV cured or is UV cured followed by cooling. The material is taken up on large rolls for inspection and packaging.

Figure 2:
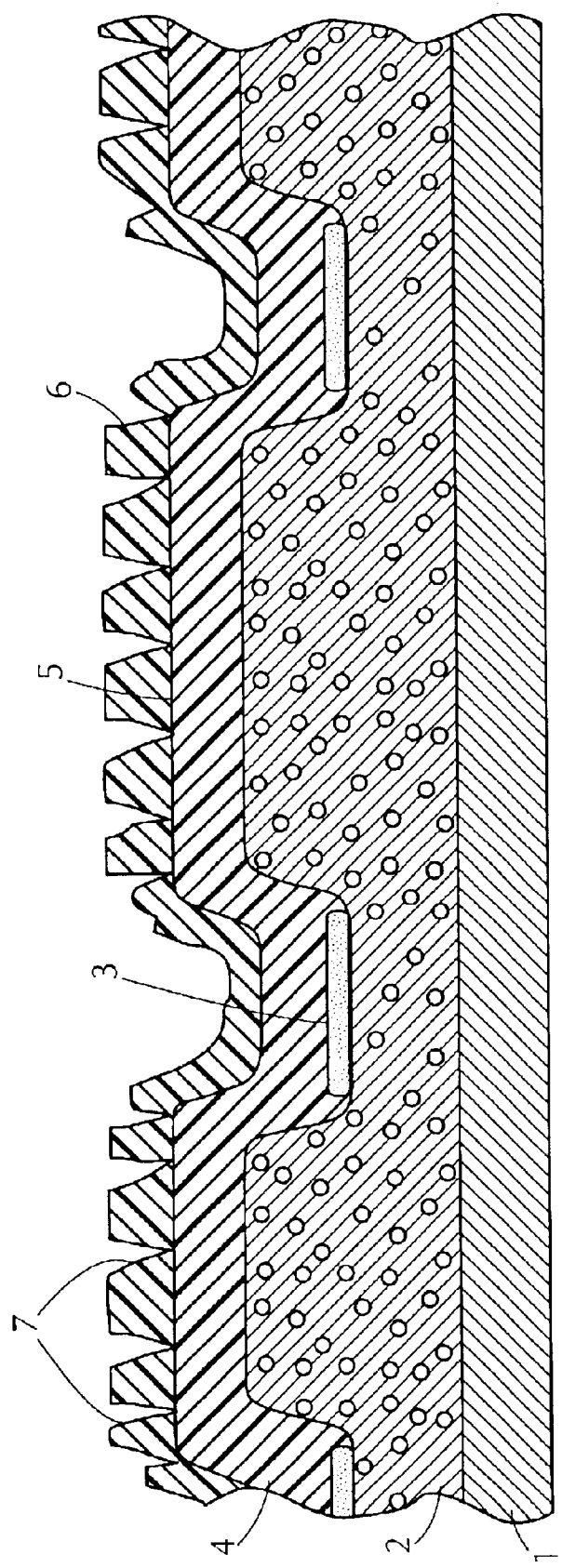
FIG. 2 is a fragmentary sectional view through a product made according to the process illustrated in FIG. 1. This view is only for illustrative purposes and it is not intended that the thicknesses of the various layers of components shown are drawn to scale.

An example of a product of the invention, wherein the surface covering base is a chemically embossed resilient floor covering product, having the construction illustrated in FIG. 2 is prepared by the process of FIG. 1. A sheet substrate 1 is fused to a foamed (expanded) plastic layer 2 which has been printed with an ink 3 containing chemical suppressants to cause chemical embossing. Plastic top layer 4 is fused to the foamed plastic and ink layers. The top surface 5 of the plastic top layer is coated with a UV cured PU layer 6 which has been mechanically embossed as illustrated by the depressions (texture) 7. The mechanically embossed depressions can be in the PU layer only or they can be in both the PU layer and the plastic top layer. The depth of mechanical embossing can be varied conventionally and the product can be made with or without mechanical embossing in depressed areas where the product has been chemically embossed.

The invention is applicable to any surface covering which can be coated effectively with a photopolymer and then mechanically embossed. This includes resilient sheet materials which have not been previously embossed by other means, vinyl composition tiles, solid vinyl tiles, luxury vinyl tiles and resilient materials which have been previously embossed, such as by chemical embossing, island printing of foamable plastisols, mechanical embossing to create a relief as in U.S. Pat. No. 3,655,312, or any combination thereof.

Each component of the product and each step of the process of the invention will now be described with reference to various preferred and alternative embodiments. All percentages set forth herein are by weight/weight unless otherwise specified.

The Substrate

The substrate is a relatively flat, fibrous or non-fibrous, backing sheet material, such as a fibrous, felted or matted, relatively flat sheet of overlapping, intersecting fibers. The substrate can, if desired, comprise felts or papers which are woven or non-woven. It can comprise knitted or otherwise fabricated textile material or fabrics made from cellulose, glass, natural or synthetic organic fibers, or natural or synthetic inorganic fibers, or supported or non-supported webs or sheets made therefrom, or filled or unfilled thermoplastic or thermoset polymeric materials. These and other substrate base materials are well known in the art and need not be further detailed here.

In one embodiment of the invention, a release substrate is used to facilitate manufacture of a floor covering product. Such products are capable of stretching or shrinking to accommodate movement of the underlying building material. They are also useful for covering existing flooring material which may have embossing or imperfections.

Release substrates are generally made from the same substrate materials as described above except that they further comprise a release coating. The release coating allows the substrate to be easily stripped from the layer overlying the substrate as the final step of the floor covering manufacturing process before inspection and packaging. Typical release coatings include polyvinyl alcohol, silicone, fluorocarbon based compositions, and the like.

Latex Layer

The latex layer is optional and can be applied to seal one or both sides of the substrate. It is a smooth coating which may be colored or not colored, filled or unfilled. It can be substantially uniformly coated over the substrate to a thickness from less than about 0.1 to about 4 mils, and where a tinted layer is desired, preferably from about 1.5 to about 2.5 mils. Conventional means for coating the substrate with the latex layer can be used and are not critical to the invention. Such means include an air knife, a knurled rotogravure application (sometimes referred to as a plain etch), rotary screen, draw down bar, or wire would bar (wherein the grooves provided by the wires assist in metering the flow of the latex).

Following application of the latex layer, it is dried prior to further processing. This can be accomplished in a hot air over at a temperature from about 105° C. to about 165° C., for from about 4 minutes to about 10 seconds, preferably from about 2 minutes to about 20 seconds. Lower temperatures and longer times may be used as long as conditions are adequate to remove water. Higher temperatures and shorter times may also be used with sufficient air velocity as long as the latex layer is not caused to bubble.

The latex layer can be made from any commonly available latex formulation as long as it is compatible with the substrate and the foamable plastic layer. The latex composition preferably should have minimal volatile organic component generating properties and should be moisture and alkali resistant and have good aging properties. It should also have good adhesion compatibility with the foamable plastic layer. Suitable latexes include crosslinkable ethylene, vinyl acetate latexes, crosslinkable acrylic latexes, ethylene vinyl chloride emulsions, PVC and polyvinyl acetate latexes, PVC and polyvinyl acetate copolymer latexes and butadiene-acrylonitrile latexes.

Foamable Plastic Layer

The foamable plastic layer can be comprised of any suitable material known in the art for producing foamed plastic layers on covering materials, but is typically a PVC plastisol, an organosol, a polyolefins, ionomers, plasticized PVC or thermoplastic rubber. This layer can be pigmented or be free of pigmentation. If the layer is pigmented, a color is preferably selected which is the average of the colors of the end product so that the appearance and aesthetics of the product are maintained during its working life. To one skilled in the art, the average color means the color perceived when one looks at a surface from a distance of more than about five feet.

As used herein, the term "plastisol" is generally intended to cover a relatively high molecular weight PVC resin dispersed in one or more plasticizers. The plastisol upon heating or fusing forms a tough plasticized solid. For purposes of this specification, plastisol compositions are also intended to include organosols, which are similarly dispersed PVC resin materials that, in addition, contain one or more volatile liquids which are driven off upon heating.

The foamable plastic layer may include any of the various PVC resin materials normally used in connection with coating of decorative sheet materials and may specifically include, but are not limited to those described in U.S. Pat. No. 3,458,337. While a suitable blowing agent as taught by the above-mentioned patent may be used, a blend of azodicarbonamide (ABFA) and p,p'oxybis (benzene sulfonyl hydrazide) (OBSH) blowing agents can be used instead. Additional conventional ingredients such as stabilizers, blowing agent catalysts, etc. can be used. In a preferred embodiment of the invention, the PVC resin used comprises both dispersion and blending resin in ratios from about 1:2 to about 5:1 dispersion resin to blending resin. Although the preferred foamable plastic layer is a PVC homopolymer resin, other vinylchloride resins can be employed. Other synthetic resins are suitable such as polystyrene, substituted polystyrene (preferably wherein the substituents are selected from the group consisting of alkyl having 1–10 carbons preferably 1–4 carbons, and aryl having 6–14 carbons), polyolefins such as polyethylene and polypropylene, acrylates and methacrylates, polyamides, polyesters and any other natural or synthetic resin.

The composition of the foamable plastic layer must be compatible with the underlying substrate or latex layer and the first printed layer of this invention and must provide a smooth and uniform surface for the first printed layer. The composition also must be otherwise compatible with the overall product composition and, therefore, within the principles of this invention. Thus it is not essential that a plastisol always be used. Organosols and aqueous latexes are also of use, employing as the dispersing or suspending media, organic solvents and water, respectively, rather than plasticizers as in the case of a plastisol.

When the preferred plastisol is employed, typical plasticizers which can be used are dibutyl sebacate, butyl benzyl sebacate, dibenzyl sebacate, dioctyl adipate, didecyl adipate, dibutyl phthalate, dioctyl phthalate, dibutoxy ethyl phthalate, butyl benzyl phthalate, dibenzyl phthalate, di(ethylhexyl) phthalate, alkyl or aryl modified phthalate esters, tricresyl phosphate, octyl diphenyl phosphate, dipropylene glycol dibenzoate, dibasic acid glycol esters and alkyl aryl or alkyl aryl hydrocarbons and the like.

Those skilled in the art will appreciate that in addition to the basic resin constituents, other commonly employed constituents can be present in plastisols. These can include conventional stabilizers/accelerators initiators, catalysts, etc. such as zinc oleate, dibasic lead phosphite, etc., conventional heat or light stabilizers, such as metallic soaps, etc., ultraviolet absorbers, colorants, dyes or pigments, notably titanium dioxide, solvents and diluents, such as xylene, mineral spirits, dodecyl benzene, etc., fillers such as clay, limestone, etc., viscosity modifiers, antioxidants, bacteriostat and the like.

The foamable plastic layer is substantially uniformly applied in its liquid state to the underlying surface by conventional means such as a knife-over roll coater, direct roll coater, rotary screen, draw down bar, reverse roll coater or wire wound bar. The particular means for applying the layer does not relate to the essence of the invention, and any suitable coating means can be employed.

The thickness of the foamable, liquid plastic layer as it is applied to the underlying surface is substantially uniform and is in the range from about 3 to about 30 mils, preferably from about 6 to about 16 mils. The layer can be thicker or thinner as may be required by the particular product application.

In the embodiment of the invention wherein a release substrate is used, the foamable, liquid plastic layer is generally from about 6 to about 30 mils thick and preferably from about 10 to about 20 mils thick. Solid vinyl and/or chemically blown foams are generally used in this type of application. Mechanical foams which have had air whipped into them under pressure by a frothing machine also can be used. Mechanical foams can be comprised of plastisols with a silicone or organic surfactant, polyurethane, rubber latex such as styrene butadiene, acrylic, and other compositions which can be frothed into a mechanical foam as are known in the art. The whipped mechanical foams are applied to the release substrate using a knife over roll coater, roll over roll coater or other conventional means.

After the foamable, liquid plastic layer is a applied to the substrate, the combination is heated for a period of time and at a temperature sufficient to gel the plastic composition, but not sufficient to activate or to decompose the blowing or foaming agent present in the plastic composition. This can be done in an oven or on a heated chrome drum. If an oven is used for the gelling step, a residence time in the oven from about 0.5 minutes to about 3.5 minutes at an oven temperature from about 160° C. to about 120° C. will give good results. If a chrome drum is used, a dwell time on the drum of from about 8 seconds to about 30 seconds at a drum temperature of from about 155° C. to about 115° C. will give good results. The higher temperatures are used with shorter residence or dwell times and lower temperatures with longer times. The layer is then cooled to form a pre-gel which provides a surface suitable for printing. Cooling is generally accomplished by contacting the surface of the foamable, gelled plastic layer (and sometimes the underside of the substrate) with one or more cooling drums. Ambient or chilled water is circulated through the drums. Cooling may be enhanced with the use of fans or blowers.

The Printed Layer

The printed layer is in the form of a pattern or design. It can be comprised of one or more layers of ink.

Suitable printing inks include those normally used in the manufacture of floor covering. These include plastisol, solvent-based systems and water-based systems. Such systems can include a chemical suppressant in those cases where chemical embossing effects are desired. Such suppressants are well known in the art (e.g., see U.S. Pat. No. 3,293,094). Ultraviolet curable printing inks can also be used.

The printing ink may be pigmented or non-pigmented and may include organic pigments or inorganic pigment particles such as titanium dioxide, chromium dioxide, cadmium sulfide, iron oxide, carbon black, mica and the like. Decorative reflective particles may also be included as part of the printing ink composition or may be separately applied either randomly or by selective deposition in the form of a pattern or design.

Printing can be effected by rotogravure, flexigraphic, screen printing, pad or knurled printing, or other printing techniques conventionally employed in making floor or wall covering products.

When more than one layer of ink is employed, the types and components of the inks used on each printed layer can be the same or different. For example, the layers can be printed with designs which may be in register or not, depending upon the desired decorative effects. As another example, the first printed layer can be printed in a design and the second printed layer can be a uniform transparent or translucent print containing decorative reflective particles. Other variations and combinations will be evident to those skilled in the art.

Plastic Top Layer

The plastic top layer is thermoplastic and can be a plastisol or organosol additionally containing a plasticizer system, associated diluents, viscosity control aids and stabilizers. It is preferably a clear (transparent) layer but it can be slightly tinted so long as it is translucent.

The composition of the plastic top layer can be any of the compositions that are suitable for use in the foamable plastic layer, but without the foaming or blowing agent. Preferably, the plastic top layer employed according to the invention is a clear, unfilled, resinous polymer composition, such as a polyvinyl chloride ("PVC") plastisol.

The plastic top layer is substantially uniformly applied to the underlying printed surface by conventional means such as knife-over roll coater, direct roll coater, air knife, rotary screen, draw down bar, reverse roll coater or wire wound bar. The particular means for applying the layer does not relate to the essence of the invention and any suitable coating means can be employed.

The thickness of the plastic top layer, as it is applied in its liquid, tacky, ungelled state to the underlying surface, is substantially uniform and is in the range from about 4 to about 40 mils, preferably from about 10 to about 20 mils. The layer can be thinner or thicker as may be required by the particular product application.

Fusion and Expansion

After the plastic top layer is applied, the product is subjected to heat to fuse the layers and expand the foamable plastic layer. The product is passed through an oven maintained at a temperature from about 150° C. to about 230° C., preferably from about 175° C. to about 210° C., for a residence time from about 1 to 7 minutes. An IR oven, a hot air recirculating or a combination IR-hot air recirculating oven operated at these temperatures is generally employed.

The Photopolymer Coating and Mechanical Embossing

When the product exits the fusion and expansion oven, the temperature of the top surface is lowered to a temperature from about 90° C. to about 15° C. by air or water cooled drums. Then a photopolymer coating is applied to the surface. The photopolymer is an ultraviolet (UV) curable cross-linkable polyurethane (PU). Water-based and/or solvent-based polyurethane can be used but water-based compositions are preferred for safety and environmental reasons. The PU is dried using heated air, IR, pulsed air, microwave, partial UV curing or the like, provided that the PU must retain its thermoplastic character (i.e., not fully cured) after drying at this stage of the process. Partial UV curing at this stage can also be used to achieve desired gloss variations in the end product. The temperature of the liquid water borne polyurethane when it is applied to the surface should be maintained below about 40° C. when the surface is hot to avoid breaking the emulsion and causing coalescence. Heat is then applied to swell the coated surface by softening the plastic top layer and the dried PU layer to prepare the surface for mechanical embossing. Heat can be applied by infra red ("IR") heating or other conventional means and the surface temperature is brought to from about 140° C. to about 180° C., preferably about 165° C., prior to mechanical embossing. The surface is mechanically embossed and in the preferred embodiment both the PU layer and the top surface are simultaneously mechanically embossed because the PU layer is very thin. It should be noted that the mechanical embossing, in addition to providing a desired texture having excellent fidelity, can be used to achieve gloss variations in the end product. Then the material is either cooled down and UV cured or it is UV cured and cooled down to room temperature or a temperature compatible with rolling the material in large rolls ready to be inspected and packaged.

The polyurethane provides a dry surface which may be heated to the softening temperature of the plastic layer underneath without becoming tacky or otherwise in such a state that it would be impossible to pass it onto a textured roll for mechanical embossing. On the contrary, it takes the imprint of that roll with a fidelity that could never have been reached if the process was inverted and the plastic layer was mechanically embossed first and then coated with the polyurethane layer on top.

This process also provides better results when compared with processes wherein the polyurethane layer is coated after the mechanical embossing step and because it uses the latent heat still in the product to help dry the coating so the process is more environmentally friendly.

The following are some examples of preferred embodiments of the invention.

EXAMPLES

The polyurethane is applied in excess with a roll coater. Thereafter an air knife is used to control the exact amount to be laid on the flooring material. In our experiments, we applied 15 micrometers ("um") dry. We used various means to dry the polyurethane, including an air blown oven, microwave oven and an oven combining IR @ 2.5 um wavelength with air blowing 3,000 m$^3$/h, the exhaust being around 5,000 m$^3$/h and this was the most preferred drying method. This oven is available from Glenro in the USA or Olbrich in Germany with IR elements from Krelus in Germany. With an installed power of 250 KW over a length of 2 m, the drying time is 8 seconds and the flooring material surface temperature reaches about 100° C.

The UV crosslinkable PU can be formulated with or without acrylics, in a solvent or water phase or as an emulsion in a water/alcohol mixture. We prefer the water borne system to minimize fire risks and to protect the environment. The preferred coating is a dispersion of an acrylic aliphatic urethane in a water phase. All PU when dry must be non-tacky when it is reheated. If it is tacky, a partial UV cure may resolve the problem. If not, a different PU needs to be selected.

Typical formulations are as follows:

| Material | Quantity | Supplier | Type |
| --- | --- | --- | --- |
| Neorad R450 | 100.0 | Avecia | Acrylic grafted polyurethane resin |
| Deuteron MK | 2.0 | Deuteron | Matting agent |
| Isopropanol | 1.5 | | |
| Esacure KIP 100F | 1.5 | Lamberti | Photoinitiator |
| Acematt TS 100 | 0.2 | Degussa | Matting agent |
| Neocryl AP 2860 | 1.0 | Avecia | Antifoaming agent |
| BYK 346 | 1.0 | BYK Chemie | Levelling agent |
| Aquamat 216 | 1.0 | BYK Cera | Polyethylene wax |
| Coatex Rheo 2000 | 0.4 | Coatex | Thickener |
| Ammonia 20% | 0.31 | | pH controller |

The dry content of this formulation is 40%.

The following formulation is employed for improved scuffing resistance and can be used in high traffic commercial products and sports floorings:

| Material | Quantity | Supplier | Type |
| --- | --- | --- | --- |
| Neorad R450 | 50.0 | Avecia | Acrylic grafted polyurethane resin |
| Neorad R440 | 50.0 | Avecia | polyurethane resin |
| Deuteron MK | 2.0 | Deuteron | Matting agent |
| Isopropanol | 1.5 | | |
| Esacure KIP 100F | 1.5 | Lamberti | Photoinitiator |
| Acematt TS 100 | 2.0 | Degussa | Matting agent |
| Neocryl AP 2860 | 1.0 | Avecia | Antifoaming agent |
| BYK 346 | 1.0 | BYK Chemie | Levelling agent |
| Ammonia 20% | 0.31 | | pH controller |

The dry content of this formulation is 40%.

Any type of UV unit can be used to cure either formulation and with the improved scuffing formulation a non-inert unit can be used such as the IST, Type UEHL, from Germany equipped with 200W/inch mercury lamps, saving expensive nitrogen blanketing. We employed this unit to cure at 500 mJ/cm$^2$ with an average UV output of 0.17W/cm$^2$.

The temperature peak under the UV was 80° C. and the cure time about 15 sec.

Flame Retardants and Smoke Suppressants

Conventional flame retardants and smoke suppressants which are compatible with the various materials used in accordance with the invention can be added as an option at any stage of the process. They can be impregnated into the substrate and/or admixed with any one or a combination of the latex layer, the foamable plastic layer, the plastisol layer, or the urethane layer.

Flame retardants and smoke inhibitors which can be used in accordance with the invention include aluminum trihydrate, zinc borate, magnesium hydroxide, antimony trioxide, phosphates and other compounds and compositions which are compatible with the various constituents of the products of the present invention. They are added in effective amounts which will be apparent to those skilled in the art based on manufacturers specifications and code requirements.

Static Dissipation

If it is desired to adjust the electrical properties of the product of the invention, the formulation of the coating used in each layer and the composition of the substrate may need to be modified. The objective is to lower the resistance (raise the conductivity) of the product. Standards and testing procedures for surface to surface and surface to ground resistance for floor coverings are well known in the industry. A preferred range for static dissipative products is 1,000,000 to 1,000,000,000 ohms as tested per ASTM F-150 (standard test method for electrical resistance of conductive floor covering).

In one embodiment of the invention, carbon fibers are incorporated into the substrate to lower its resistance. Antistatic agents that can be added to a latex layer, foamable plastic layer, plastisol layer and/or polyurethane layer are commercially available and known in the art. Suitable antistatic agents include Nopcostate HS, an ethoxylated composition from Diamond Shamrock and Tebestat IK 12, a nonionic substituted polyether from Dr. Th. Boehme KG, Chem. Fabrik GMBH & Co., 8192 Geretsried 1, Germany. The particular compositions used are not critical as long as they are compatible with the other components present in the floor coverings of the invention. The antistatic agents may be added in various amounts as will be apparent to those skilled in the art depending on recommendations of the manufacturers of said compositions and the desired specifications for the floor covering product.

What is claimed is:

1. A surface covering which comprises:
    a) a surface covering base having a thermoplastic wearlayer, and
    b) a cured polyurethane layer overlaying the wearlayer and mechanically embossed with a surface texture wherein the surface texture is mechanically embossed simultaneously in the polyurethane layer and the wearlayer when the wearlayer and the polyurethane layer are in a softened state and the polyurethane layer is in a dry uncured state.

2. The surface covering of claim 1 wherein the surface covering base is selected from the group consisting of resilient sheet flooring, tile and wall covering.

3. The surface covering of claim 1 wherein the surface covering base is selected from the group consisting of resilient sheet vinyl flooring, laminate flooring, linoleum, vinyl composition tile, solid vinyl tile and luxury vinyl tile.

4. A surface covering which comprises:
    a) a substrate,
    b) a plastic top layer overlaying the substrate, and
    c) a cured polyurethane layer overlaying the plastic top layer and mechanically embossed with a surface texture wherein the surface texture is mechanically embossed simultaneously in the polyurethane layer and the plastic top layer when the plastic top layer and the polyurethane layer are in a softened state and the polyurethane layer is in a dry uncured state.

5. The surface covering of claim 4 further comprising one or more layers of printed ink between the substrate and the plastic top layer, between the plastic top layer and the polyurethane layer or between the substrate and the plastic top layer and between the plastic top layer and the polyurethane layer.

6. The surface covering of claim 4 further comprising a foamed plastic layer between the substrate and the plastic top layer.

7. The surface covering of claim 6, further comprising one or more layers of printed ink between the foamed plastic, layer and the plastic top layer.

8. A surface covering which comprises:
    a) a sheet substrate,
    b) a foamed and chemically embossed plastic layer overlaying the sheet substrate,
    c) a plastic top layer overlaying the foamed plastic layer,
    d) a cured polyurethane layer overlaying the plastic top layer and mechanically embossed with a surface texture wherein the surface texture is mechanically embossed simultaneously in the polyurethane layer and the plastic too layer when the plastic top layer and the polyurethane layer are in a softened state and the polyurethane layer is in a dry uncured state.

9. The surface covering of claim 8 further comprising one or more layers of printed ink between the plastic layer and the plastic top layer.

10. The surface covering of claim 9 wherein the ink is printed in a pattern or a design.

* * * * *